Nov. 30, 1954                M. R. IMBERTI                2,695,471
                        FISHHOOK EXTRACTING TOOL
                           Filed July 3, 1953
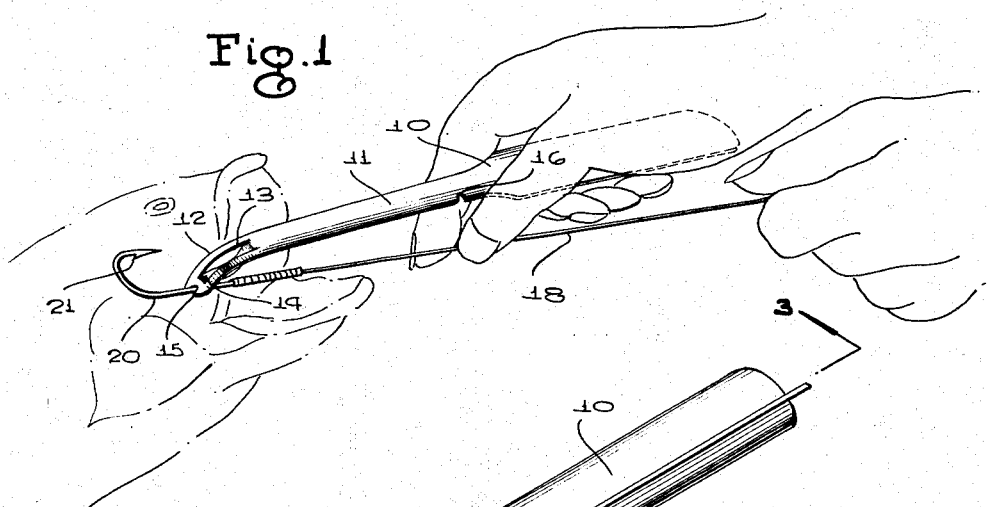
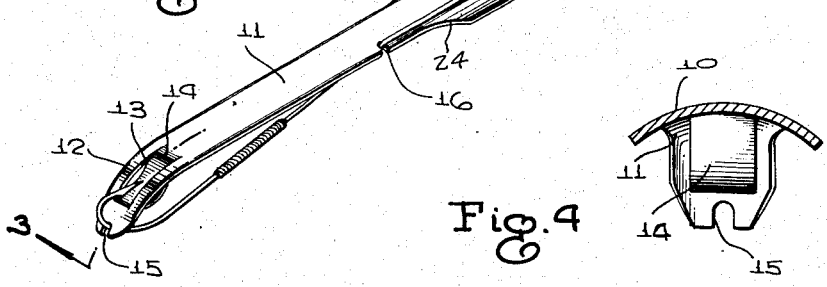
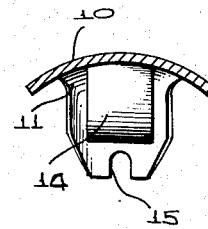
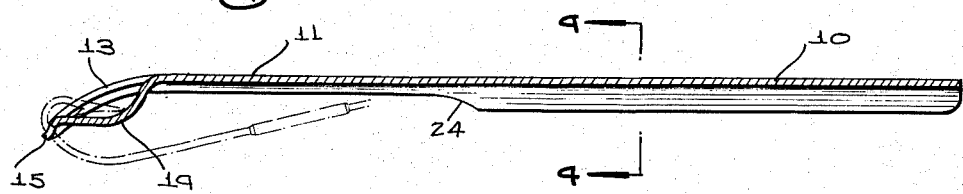
INVENTOR.
MARIO R. IMBERTI
BY
McMorrow, Berman & Davidson
ATTORNEYS

United States Patent Office 2,695,471
Patented Nov. 30, 1954

2,695,471

FISHHOOK EXTRACTING TOOL

Mario R. Imberti, Detroit, Mich.

Application July 3, 1953, Serial No. 365,882

4 Claims. (Cl. 43—53.5)

This invention relates to hand tools for extracting fish hooks from fish and more particularly to an extracting tool for engaging a fish hook adjacent the barb thereof and dislodging the barbed end of the hook from tissue in which it is embedded.

It is among the objects of the invention to provide an improved fish hook extracting tool which can be easily thrust into a fish's mouth to extract a fish hook the barbed point of which is embedded in the internal tissue of the fish; which engages the fish hook near the barbed point thereof and effectively guards the point and barb of the hook so that the hook can be forced out of the tissue in which it is engaged without extensively tearing or damaging the tissue and removed from the fish without danger of reengagement; which can be used to remove fish hooks from fish having teeth or other aquatic creatures having mouth formations constituting a hazard to the fingers of a person removing an engaged hook; which holds the fish hook firmly in place thereon by gripping the leader to which the hook is attached; and which is simple and durable in construction, economical to manufacture, convenient to use, and positive and effective in use.

Other objects and advantages will become apparent from a consideration of the following description and the appended claims in conjunction with the accompanying drawing, wherein:

Figure 1 is a perspective view showing the manner in which the fish hook extracting tool is used to extract a hook from a fish;

Figure 2 is a perspective view of the tool shown in association with a fish hook and fish hook leader;

Figure 3 is a longitudinal cross sectional view on the line 3—3 of Figure 2; and Figure 4 is a transverse cross sectional view on the line 4—4 of Figure 3.

With continued reference to the drawing, the fish hook extracting tool comprises an elongated body of sheet material, such as sheet metal, having a thickness sufficient to provide a rigid tool of sufficient structural strength for the intended purpose. The body is arcuately curved transversely thereof to give it additional stiffness and rigidity and includes a handle portion 10 of a length and width to be comfortably gripped in one hand of a person using the tool, and a tongue portion 11 of a width materially less than the width of the handle portion 10 extending longitudinally from one end of the handle portion symmetrically of the width of the latter.

The distal end portion of the tongue 11 is longitudinally curved, as indicated at 12, and provided with an opening 13 of rectangular shape elongated longitudinally of the curved end portion of the tongue, and a guard formation 14 underlying the opening 13 at the concave side of the curved end portion of the tongue in spaced relationship to the longitudinal edges of the opening, as illustrated in Figure 3, this guard formation 14 being constituted by the material of the tongue displaced inwardly of the curved end portion of the tongue to provide the opening 13.

The tongue is provided in its distal end with a notch 15 disposed medially of the width of the tongue and the distal end of the tongue is rounded off at the respectively opposite sides of the notch 15 so that the distal end of the tongue tapers symmetrically in width toward the open end of the notch 15. Near its proximal end the tongue 11 is provided with a second notch 16 in one side thereof, this notch being preferably provided in the left hand edge of the tongue when the tool is held in operative position, as illustrated in Figure 1 although such notches may be provided one in each edge of the tongue near the proximal end of the tongue, if desired.

In using the tool to extract a hook from a fish, the fish is preferably placed on a suitable supporting surface and the leader 18 grasped in the left hand of the operator at a location spaced from the associated hook 20. The tool is then held by the handle portion 10 in the right hand of the operator and so placed that the portion of the leader adjacent the hook is received in the notch 15 at the distal end of the tongue portion of the tool. With the leader still held in the left hand the tool is now moved by the right hand along the leader and the shank of the hook 20 to a location adjacent the barb 21 of the hook. The leader 18 is now placed in the notch 16 of the tool, extended along the handle portion 10 and grasped by the right hand of the operator freeing the operator's left hand which is now used to hold the fish on the support. With the fish firmly held in position, the right hand is used to force the tool further in the above described direction until the barbed and pointed end of the hook is forced out of the tissue in which it is embedded. The leader is now again grasped by the left hand and pulled tight relative to the tool so that the hook is pulled up on the distal end of the tool to the position illustrated in Figure 2 wherein the barbed and pointed end of the hook is disposed in the opening 13 and against the guard formation structure 14. The leader may then be again secured in the notch 16 and held by the right hand as the tool and hook are withdrawn simultaneously from the mouth of the fish, the guarded condition of the point and barb of the hook during this part of the procedure precluding the possibility of reengagement of the hook in the tissue of the fish as the hook is withdrawn.

The edges of the tool handle are concavely curved, as indicated at 24, at the width reduction portion at the proximal ends of the handle 10 and tongue 11 and the side edge curvature of this portion of the tool is such as to comfortably receive the thumb and forefinger of the person using the tool and provide a secure grip for forcing the tool longitudinally in either direction.

The tool permits the barbed end of the hook to be withdrawn from tissue in which it is embedded without extensively tearing or damaging the tissue and without bending the hook and can also be used to remove hooks from fish, such as sharks and baracuda, having teeth that would endanger the fingers of the person removing the hook if it were attempted to remove a hook embedded in such a fish with ordinary tools. The tool is of inexpensive, one-piece construction and of a size such that it can be conveniently carried in a tackle box and is preferably formed of a corrosion resisting material, such as stainless steel, or provided with a corrosion resistant coating so that it will not rapidly deteriorate while in storage.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hand tool for extracting fish hooks comprising a body of elongated shape including a handle portion extending longitudinally from one end thereof to a location medially of the length of said body and a tongue portion of less width than said handle portion extending from the other end of said body to the adjacent end of said handle portion and having its distal end portion longitudinally curved and provided with an opening and a guard formation underlying said opening at the concave side of the curved end portion of said tongue, said tongue portion having a notch in its distal end for engaging a fish hook adjacent the pointed end of the latter and holding the hook with the point and barb thereof disposed in said opening and against said guard formation, and having a notch in one side thereof adjacent the proximal end thereof for receiving and gripping a hook attached leader to hold the associated hook firmly in engagement with the distal end of said tongue portion.

2. A hand tool for extracting fish hooks comprising a body of elongated shape including a handle portion extending longitudinally from one end thereof to a location medially of the length of said body and a tongue portion of less width than said handle portion extending form the other end of said body to the adjacent end of said handle portion and having its distal end portion longitudinally curved and provided with an opening and a guard formation underlying said opening at the concave side of the curved end portion of said tongue, said tongue portion having a notch in its distal end for engaging a fish hook adjacent the pointed end of the latter and holding the hook with the point and barb thereof disposed in said opening and against said guard formation, and having a notch in one side thereof adjacent the proximal end thereof for receiving and gripping a hook attached leader to hold the associated hook firmly in engagement with the distal end of said tongue portion, said guard formation being constituted by material displaced from said tongue portion inwardly of the longitudinally curved end portion of the latter to provide said opening.

3. A hand tool for extracting fish hooks comprising a body of elongated shaped including a handle portion extending longitudinally from one end thereof to a location medially of the length of said body and a tongue portion of less width than said handle portion extending from the other end of said body to the adjacent end of said handle portion and having its distal end portion longitudinally curved and provided with an opening and a guard formation underlying said opening at the concave side of the curved end portion of said tongue, said tongue portion having a notch in its distal end for engaging a fish hook adjacent the pointed end of the latter and holding the hook with the point and barb thereof disposed in said opening and against said guard formation, and having a notch in one side thereof adjacent the proximal end thereof for receiving and gripping a hook attached leader to hold the asssociated hook firmly in engagement with the distal end of said tongue portion, said body comprising a single piece of sheet material of sufficient thickness to render said body substantially rigid and provide adequate structural strength for the intended use of the tool.

4. A hand tool for extracting fish hooks comprising a body of elongated shape including a handle portion extending longitudinally from one end thereof to a location medially of the length of said body and a tongue portion of less width than said handle portion extending from the other end of said body to the adjacent end of said handle portion and having its distal end portion longitudinally curved and provided with an opening and a guard formation underlying said opening at the concave side of the curved end portion of said tongue, said tongue portion having a notch in its distal end for engaging a fish hook adjacent the pointed end of the latter and holding the hook with the point and barb thereof disposed in said opening and against said guard formation, and having a notch in one side thereof adjacent the proximal end thereof for receiving and gripping a hook attached leader to hold the associated hook firmly in engagement with the distal end of said tongue portion, said guard formation being constituted by material displaced from said tongue portion inwardly of the longitudinally curved end portion of the latter to provide said opening, and the side edges of said tool being concavely curved at the proximal ends of said handle and said tongue.

References Cited in the file of this patent

UNITED STATES PATENTS

| Number | Name | Date |
|---|---|---|
| 1,000,775 | Buras, Jr. | Aug. 15, 1911 |
| 1,629,583 | Nelson | May 24, 1927 |
| 2,492,799 | Holland | Dec. 27, 1949 |